United States Patent Office 3,379,766
Patented Apr. 23, 1968

3,379,766
PROCESS FOR THE PRODUCTION OF HIGHER
ALKANONES FROM LOWER ALKANONES
Yu-Tang Hwang and Walter J. Sandner, Crystal Lake, and William A. Krewer, Arlington Heights, Ill., assignors, by mesne assignments, to Union Oil Company of California, Los Angeles, Calif., a corporation of California
No Drawing. Filed Dec. 31, 1964, Ser. No. 422,531
17 Claims. (Cl. 260—593)

ABSTRACT OF THE DISCLOSURE

Conversion of $C_3$–$C_6$ alkanones to higher alkanones by reaction with hydrogen over a fixed bed catalyst comprising palladium and chromium with an inert carrier.

This invention relates to a process for converting lower-boiling alkanones into higher-boiling alkanones by treatment with hydrogen in the presence of a catalyst comprising an inert carrier coated or impregnated with about 0.2 to 5% by weight of palladium and about 0.2 to 10% by weight of chromium, based on the weight of the carrier. The process of this invention is conducted in a single reaction step at a temperature of about 300° to 600° F., and a pressure of 150 to 1500 p.s.i.g., using about 0.05 to 10.0 LVHSV of ketone starting material.

The process may use any lower-boiling alkanone such as acetone, methyl ethyl ketone, diethyl ketone, methyl propyl ketone, methyl isopropyl ketone, methyl butyl ketone and methyl isobutyl ketone, that is, those having from 3 to 6 carbon atoms per molecule, individually or in any combination as a feed. By using two or more ketones simultaneously as the starting material, a more complex distribution of products is obtained. In a preferred embodiment of this invention acetone is converted to methyl isobutyl ketone and/or diisobutyl ketone.

Higher-boiling ketones are technically important chemicals finding use as solvents, in protective or decorative coating, extraction processes or chemical reactions, etc., as an ingredient in perfume formulation and as organic intermediates for the preparation of a wide variety of compounds. The ketones prepared by the process of this invention are useful for the foregoing purposes.

Conventionally, higher molecular weight ketones are prepared by a rather tedious multi-step process involving the condensation of lower ketones to hydroxyketones, dehydration of hydroxyketones to unsaturated ketones and finally hydrogenation of unsaturated ketones to saturated ketones. The instant invention constitutes an improvement over this conventional method.

Consequently, it becomes a primary object of this invention to provide a simplified process for the preparation of higher molecular weight ketones from lower molecular weight ketones.

Another object of this invention is to provide a process of producing higher molecular weight ketones from lower molecular weight ketones in a single reactor (or by a one-step reaction) in the presence of a catalyst comprising an inert carrier which presents an active surface of palladium and chromium.

An object of this invention is to provide a process of producing higher molecular weight ketones from lower molecular weight ketones by treatment with hydrogen in the presence of a catalyst comprising an inert carrier presenting a surface of palladium and chromium.

A further object of this invention is to provide a process for transforming lower molecular weight ketones, having from 3 to 6 carbon atoms in the molecule to higher molecular weight ketones by treatment with hydrogen at a temperature of about 300° to 600° F. and a pressure of 150 to 1500 p.s.i.g., with 0.05 to 10.0 LVHSV of starting ketone in the presence of a catalyst containing or coated with about 0.2 to 5.0% by weight of palladium and about 0.2 to 10% by weight of chromium, based on the weight of inert carrier which has a relatively low surface area.

A feature of this invention is the discovery that a catalyst comprising low surface area, pelleted alumina coated with the above-stated proportions of palladium and chromium is highly selective for the conversion of acetone to methyl isobutyl ketone in good yields, said feature becoming a preferred embodiment of this invention and another object thereof.

Other features, advantages and objectives of this invention will be set forth or inferred from the description of this invention. An advantage of the instant process is the fact that the catalyst is physically rugged and of low cost per pound of product with respect to its consumption, same not being deactivated by impurities such as carbon monoxide, carbon dioxide, hydrogen sulfide, hydrogen chloride, phosgene and light hydrocarbons or water up to concentrations of about 1% by weight of the feed material. Also, low capital investment in the reactor and catalyst is made possible by the high allowable LVHSV. Additional advantages are that the ratio of methyl isobutyl ketone and diisobutyl ketone in the product is adjustable to fit the market situation, i.e., MIBK/DIBK ratios of as low as 1:2 and as high as 20:1 can be attained; that the reaction system involves no corrosive catalysts or reaction products so that ordinary carbon steel may be used for construction of a reactor and purification system; and that high selectivity to MIBK is obtainable even at high conversion of acetone per pass.

The condensation of ketones to produce a hydroxy ketone is a well known reaction. For instance, contact of acetone with solid barium hydroxide converts it to diacetone alcohol. Dehydration of the hydroxy ketone to yield an unsaturated ketone, such as mesityl oxide is also well known. Saturated higher ketones, such as methyl isobutyl ketone, are formed by selective hydrogenation of the olefinic bond in the corresponding unsaturated ketones.

It is known that this series of reactions can be carried out in one step by subjecting the original ketone to hydrogenation at elevated temperatures and pressures in the presence of alkaline condensation catalyst and a hydrogenation catalyst comprising palladium. Such a process is disclosed in United States Patent 2,499,172. The process is carried out at temperatures in the range of 135° to 200° C. (275° to 392° F.) and at pressures of above about 250 p.s.i. The patentee reports 65% conversion of acetone to MIBK, and 69% yield of methyl isobutyl ketone, which is equivalent to the selectivity based on acetone, when hydrogenating acetone mixed with an aqueous 5% KOH solution over a 5% palladium-on-charcoal catalyst at 150° C. and 1000 p.s.i. (initial) for 4.5 hours in a stainless steel rocking bomb.

In accordance with the instant invention the discovery has been made that although ordinarily palladium, like rhodium, nickel and cobalt catalyzes the main reaction, that is, the hydrogenation of acetone to isopropyl alcohol, the use of palladium in combination with chromium unexpectedly reverses the yield pattern, completely minimizing the main reaction to a negligible level and promotes the production of a formerly negligible by-product, namely, methyl isobutyl ketone to primary importance. Also, this reverse promotional effect is specific to chromium among Group VI(A) elements since, as subsequently shown, molybdenum, which is closely related to chromium, promoted the production of mesitylene rather than MIBK, while palladium with other metals or without chromium is generally ineffective and thus not suitable for the reaction.

In order to demonstrate the invention a number of experiments were conducted using laboratory scale apparatus. The acetone feed was measured by a burette and pumped into the preheater section of a standard reactor where it was vaporized and mixed with a hydrogen stream metered through a high-pressure rotameter. The mixed preheated reactants then proceeded through a catalyst bed consisting of ⅛-inch or 3/16-inch pellets of a carrier impregnated or coated with various metal combinations. The reaction mixture from each run was condensed and sent to a gas-liquid separator from which the liquid product was withdrawn. The non-condensable gas was released through a back pressure control valve and was stripped of nearly all the condensable materials by means of a cold trap before it was measured by a gas meter. The liquid collected in the cold trap was blended in with the liquid product withdrawn from the high pressure separator. The combined liquid product was analyzed by gas chromatography and the off-gas by mass spectrometry.

In the first series of runs 1 to 15, four different types of palladium-bearing catalysts were used. Catalyst A contained approximately 0.5 wt. percent PdO, 60% CdO, 12% $ZrO_2$, 1.4% $SiO_2$ and 26.1% $Al_2O_3$. This catalyst was prepared as follows: 1.81 g. $PdCl_2$ (equivalent to 1.25 g. PdO), 150.0 g. CdO, 30.0 g. $ZrO_2$ and 68.7 g. alumina (Alcoa chemical product, H-41 containing about 5% $SiO_2$) were blended and made into a slurry with 100 cc. of 0.5% Cellosolve solution. After it was dried at 230° F. the entire mass was crushed and screened. The powder (100-mesh) was blended with 2% graphite, and pelleted (⅛"). The catalyst pellets were calcined at 900° F.

Catalyst B was a commercial catalyst manufactured by Chemetron Corporation and designated as Girdler Catalyst G-63. It was labeled as containing Pd on a specially formulated refractory support, and was recommended particularly for hydrogenation of olefins in gas streams containing mixtures of carbon monoxide and hydrogen.

Catalyst C contained approximately 0.3 wt. percent PdO, 5.0% $MoO_3$, 4.7% $SiO_2$ and 90.0% alumina. It was prepared as follows: 25.0 g. $MoO_3$ and 475.0 g. alumina (Alcoa H-41) were made into a slurry with 2% Cellosolve solution. After being dried, ground and screened (60 mesh), the powder was blended with 3.5% graphite and pelleted (⅛" pellets). The pellets were then calcined at 1950° F. for 3 hours. To coat these pellets with Pd, $PdCl_2$ (0.555 g.) was first dissolved in 150 cc. aqueous solution containing 0.845 g. KCl. The $MoO_3$-$Al_2O_3$ pellets were first soaked in n-heptane and then partially dried. The pellets were then dipped into $PdCl_2$-KCl solution and Pd deposited on the exterior of the pellets by adding formaldehyde solution while heating. The catalyst was stabilized by heating at 450° F. for 1 hour and at 600° F. for 2 hours.

Catalyst D was prepared by making 8.7 g. $PdCl_2$, 40.0 g. of 85% KOH and 154.0 g. alumina Alcoa H-41) into a slurry with 80 cc. $H_2O$ containing 0.5% Cellosolve. After being dried at 230° F., the lump was crushed, screened (35 mesh) and made into ⅛" pellets. The pellets were then calcined at 450° F. for 1 hour and at 950° F. for 2 hours. This catalyst was found to contain approximately 3.1 wt. percent PdO, 17.5% KOH, 4.0% $SiO_2$ and 75.4% $Al_2O_3$.

Using the aforedescribed apparatus, the catalysts were tested for various lengths of time, at different average reaction temperatures and at 400 p.s.i.g. The results are shown in Table I. Prior to testing, each catalyst was treated with hydrogen at 600° to 700° F. for about 5 hours. This procedure is hereafter referred to as "activation." The solvent "Cellosolve" used in preparing the catalysts herein, is illustrative only and is a proprietary product of Carbide and Carbon Chemicals Corporation, same being 2-ethoxy ethanol.

TABLE I.—CONVERSION OF ACETONE AND HYDROGEN TO MIBK

[Pd-bearing catalyst]

| | Catalyst | | | | | | |
|---|---|---|---|---|---|---|---|
| | A | | | B | | | |
| Run No | 1 | 2 | 3 | 4 | 5 | 6 | 7 |
| Catalyst Age, hrs | 10-14 | 19-23 | 24-28 | 12-14 | 17-19 | 22-24 | 29-31 |
| Max. Temp., °F | 271 | 371 | 485 | 280 | 387 | 500 | 535 |
| Average Temp., °F | 368 | 353 | 466 | 276 | 380 | 478 | 521 |
| Pressure, p.s.i.g | 400 | 400 | 400 | 400 | 400 | 400 | 400 |
| Acetone, LVHSV | 0.147 | 0.148 | 0.146 | 0.147 | 0.145 | 0.144 | 0.145 |
| $H_2$/acetone wt. ratio | 0.061 | 0.061 | 0.062 | 0.066 | 0.067 | 0.068 | 0.067 |
| Conversion, percent based on acetone | 12.4 | 49.4 | 81.7 | 56.5 | 88.8 | 91.0 | 90.5 |
| Selectivities, percent based on acetone (averaged over a period specified): | | | | | | | |
| MIBK | 4.2 | 2.1 | 1.0 | 5.5 | 10.1 | 12.3 | 19.9 |
| DIBK | | | | 0.2 | 1.3 | 7.4 | 14.8 |
| MIBC | | 12.6 | 2.1 | 2.9 | 11.3 | 23.1 | 19.3 |
| IPA | 25.3 | 82.5 | 88.5 | 88.6 | 66.5 | 45.1 | 20.5 |
| Mesityl oxide | 70.5 | 2.8 | 1.2 | | | | |
| Mesitylene | | | | | 0.2 | 1.3 | 2.9 |
| Others | | | 7.2 | 2.8 | 10.7 | 10.8 | 22.6 |

TABLE I—Continued

| | Catalyst | | | | | | | |
|---|---|---|---|---|---|---|---|---|
| | C | | | | | D | | |
| Run No. | 8 | 9 | 10 | 11 | 12 | 13 | 14 | 15 |
| Catalyst Age, hrs | 27-9 | 32-4 | 36-8 | 46-8 | 56-8 | 8-10 | 21-23 | 30-32 |
| Max. Temp., °F | 491 | 542 | 543 | 380 | 433 | 303 | 381 | 487 |
| Average Temp., °F | 488 | 540 | 451 | 378 | 432 | 283 | 373 | 476 |
| Pressure, p.s.i.g | 400 | 400 | 400 | 400 | 400 | 400 | 400 | 400 |
| Acetone, LVHSV | 0.99 | 1.00 | 1.00 | 3.95 | 4.00 | 0.148 | 0.159 | 0.148 |
| H$_2$/acetone wt. ratio | 0.031 | 0.031 | 0.031 | 0.019 | 0.018 | 0.075 | 0.070 | 0.073 |
| Conversion, percent based on acetone | 32.7 | 42.5 | 32.0 | 6.9 | 13.3 | 96.9 | 94.2 | 92.3 |
| Selectivities, percent based on acetone (averaged over a period specified): | | | | | | | | |
| MIBK | 3.6 | 3.9 | 0.4 | 1.5 | 2.6 | 0.1 | 0.9 | 9.0 |
| DIBK | | | | | | | | 7.8 |
| MIBC | | 0.2 | 0.4 | | | 1.0 | 3.8 | 25.6 |
| IPA | 0.3 | 0.8 | 0.6 | | 1.4 | 98.9 | 95.3 | 47.5 |
| Mesityl oxide | 9.5 | 4.8 | 6.8 | 93.0 | 32.1 | | | |
| Mesitylene | 38.4 | 44.2 | 55.1 | 5.5 | 19.7 | | | |
| Others | 48.2 | 46.1 | 36.7 | | 44.2 | | | 9.1 |

In Table I the values for "other" products were obtained by difference. Consequently, any probable errors in the determination of MIBK, DIBK, etc. would be reflected in these figures.

The conversion of acetone per pass using catalyst A increased with temperature, but the selectivity for MIBK fell off and either isopropyl alcohol or mesityl oxide were the primary products. The conversion of acetone per pass also increased with increased temperature for catalyst B with the selectivity for MIBK being very low. The acetone conversion per pass for catalyst C was still fairly high even at a quite high liquid volume space velocity (1~4), but the selectivity for MIBK was poor at temperatures from 380° to 540° F. and either mesitylene or mesityl oxide was the predominant product. Catalyst D also showed very poor selectivity for MIBK although the conversion of acetone per pass was extremely high (92 to 96.9%).

In another series of experiments the rhodium-bearing and nickel-bearing catalysts were tested in accordance with the aforeoutlined procedure and the results are shown in Runs 16 to 23 in Table II. All of these tests were run at 400 p.s.i.g. except Run 19 which was conducted at 800 p.s.i.g.

TABLE II.—CONVERSION OF ACETONE AND HYDROGEN TO MIBK
[Rhodium and nickel bearing catalysts]

| | Catalysts | | | | | | | |
|---|---|---|---|---|---|---|---|---|
| | E | | | | F | | | |
| Run No. | 16 | 17 | 18 | 19 | 20 | 21 | 22 | 23 |
| Catalyst Age, hrs | 11-14 | 19-23 | 28-32 | 33-37 | 10-14 | 19-23 | 28-32 | 37-41 |
| Max. Temp., °F | 315 | 379 | 225 | 228 | 330 | 392 | 515 | 550 |
| Average Temp., °F | 276 | 368 | 204 | 201 | 289 | 360 | 470 | 500 |
| Pressure, p.s.i.g | 400 | 400 | 400 | 800 | 400 | 400 | 400 | 400 |
| Acetone, LVHSV | 0.141 | 0.143 | 0.156 | 0.151 | 0.395 | 0.410 | 0.362 | 0.406 |
| H$_2$/acetone wt. ratio | 0.064 | 0.063 | 0.058 | 0.060 | 0.096 | 0.092 | 0.104 | 0.094 |
| Conversion, percent based on acetone | 99.6 | 97.6 | 100.0 | 100.0 | 98.1 | 92.8 | 84.1 | 83.0 |
| Selectivity, percent based on acetone (averaged over a period specified): | | | | | | | | |
| MIBK | | 0.7 | | | 0.4 | 2.6 | 14.0 | 20.5 |
| DIBK | | Trace | | | 0.1 | 0.6 | 5.4 | 10.9 |
| MIBC | 1.4 | 8.6 | 1.0 | 0.4 | 8.6 | 15.4 | 19.4 | 5.4 |
| IPA | 98.6 | 88.4 | 99.0 | 99.6 | 90.9 | 81.4 | 50.0 | 12.9 |
| Mesitylene | | | | | [1] N.D. | [1] N.D. | [1] N.D. | [1] N.D. |
| Others | | 12.3 | | | | | 11.2 | 50.3 |

[1] Not determined.

In Table II catalyst E contained approximately 0.2 wt. percent RhO, 4.4% KOH and 95.4% Al$_2$O$_3$; and catalyst F contained 1.0 wt. percent Ni$_2$O$_3$, 48.9% ZnO, 22.6% ZrO$_2$, 18.2% Celite, 0.5% SiO$_2$ and 8.8% Al$_2$O$_3$. As in the data reported in Table I, the selectivity based on acetone for "others" in the products was obtained by difference. A blank or dash in the tables means not present, while "N.D." means not determined.

As seen from the data in Table II, catalyst E was highly selective for the preparation of isopropyl alcohol and catalyst F also showed a high selectivity for isopropyl alcohol at low temperatures. Although the selectivity for MIBK was increased in the latter case as the temperature was increased, it was still very low even at 500° F. and was accompanied with the predominant formation of "other" materials.

In the next series of experiments (Runs 24 to 29) reported in Table III, catalyst G contained approximately 2.0 wt. percent CuO, 50% MgO, 2.4% SiO$_2$ and 45.6% Al$_2$O$_3$. These runs were all made at 400 p.s.i.g.

TABLE III.—CONVERSION OF ACETONE AND HYDROGEN TO MIBK
[Copper-bearing catalyst]

| | Catalyst G | | | | | |
|---|---|---|---|---|---|---|
| Run No. | 24 | 25 | 26 | 27 | 28 | 29 |
| Catalyst Age, hrs | 10-14 | 19-23 | 28-32 | 37-41 | 46-50 | 59-61 |
| Max. Temp., °F | 282 | 389 | 492 | 570 | 536 | 545 |
| Average Temp., °F | 269 | 368 | 480 | 549 | 528 | 532 |
| Pressure, p.s.i.g | 400 | 400 | 400 | 400 | 400 | 400 |
| Acetone, LVHSV | 0.165 | 0.163 | 0.162 | 0.160 | 0.394 | 0.984 |
| H$_2$/acetone wt. ratio | 0.055 | 0.055 | 0.056 | 0.056 | 0.023 | 0.009 |
| Conversion, Percent based on acetone | 100.0 | 98.0 | 93.5 | 93.3 | 66.9 | 36.7 |
| Selectivities, Percent based on acetone (averaged over the period specified): | | | | | | |
| MIBK | | 1.3 | 4.6 | 5.0 | 14.2 | 14.3 |
| DIBK | | 1.9 | 8.5 | 8.2 | 5.7 | 2.6 |
| MIBC | 7.6 | 19.3 | 7.9 | 4.4 | 1.5 | 0.6 |
| IPA | 92.4 | 36.0 | 17.7 | 10.2 | 7.5 | 7.3 |
| Mesitylene | | 0.1 | 0.7 | 1.4 | | |
| Others | | 41.4 | 60.6 | 70.8 | 71.1 | 75.2 |

From these results it is apparent that the copper catalyst used exhibited a high selectivity for isopropyl alcohol at low temperatures with a small increase in selectivity for MIBK as the temperature was increased. "Other" materials predominate at temperatures above 370° F.

Table IV sets forth the results using a chromium-bearing catalyst of four different compositions in the conversion of acetone to MIBK. Catalyst H contained roughly 13.8 wt. percent zinc chromite, 34.5% barium oxide, 22.3% silica and 29.4% alumina after calcination. It was prepared by blending 50.0 g. zinc chromite, 160.9 g. barium carbonate and 75.0 g. silica in the form of powder. The mixture was then made into a slurry with 235 ml. solution of 1% Cellosolve. After being dried at 230° F. overnight, the admixture mass was ground to 100 mesh size. About 112 g. of alumina powder (100 mesh) was blended prior to the pelleting. The final calcination was carried out at 450° F. for 1 hour and at 900° F. for 2 hours.

Catalyst I was prepared similarly as catalyst H except zinc chromite was replaced by copper chromite. It contained approximately 12.8% copper chromite, 32.0% barium oxide, 21.0% silica and 34.2% alumina.

Catalyst J was similar to catalyst H in its preparation except that zinc chromite was replaced by iron-copper chromite. It contained approximately 14.1 wt. percent iron-copper chromite, 35.2% barium oxide, 22.5% silica and 28.2% alumina.

Catalyst K containing 10 wt. percent $Cr_2O_3$, 4.5% $SiO_2$ and 85.5% $Al_2O_3$ was prepared by blending 20.0 g. $Cr_2O_3$ and 180.0 g. $Al_2O_3$ (Alcoa H–41), followed by the addition of 200 ml. 0.5% Cellosolve solution to make a slurry. After being dried at 230° F. for 16 hours, 4% graphite was added and the 60 mesh powder was made into $\frac{1}{8}''$ pellets. Calcination was carried out at 450° F. for 1 hour, at 950° F. for 1 hour and at 1400° F. for 4 hours.

"Alcoa H–41" is a brand designation of a substantially pure alumina ($Al_2O_3$) product produced by the Aluminum Company of America, same containing not more than about 5% by wt. of $SiO_2$. Since silica itself or pumice may be used as the inert carrier, the presence or absence of $SiO_2$ in the alumina does not affect the catalyst activity. "Celite" mentioned subsequently as a suitable carrier for the instant catalyst is a proprietary product of Johns-Manville Corporation, described as a diatomaceous silica product.

moted and directed primarily by the specific catalyst though the conversions and selectivities obtained are to some extent influenced by the pressure, temperature, space velocity and hydrogen/acetone ratios. More specifically, it has been demonstrated that palladium alone or in combination with cadmium, zirconium, molybdenum or alkaline hydroxide (on alumina) is not a satisfactory catalyst for the synthesis of MIBK. Also, it has been demonstrated that nickel or rhodium belonging to the same Group VIII as palladium in the periodic table also does not readily promote the desired reaction even in the presence of an alkaline condensation catalyst. Copper in combination with a condensation element such as MgO and ZnO also failed to bring about the desired result. Another important point is that a combination of Pd and KOH which may be expected to give high selectivity to MIBK on the basis of U.S. Patent 2,499,172 is highly selective for isopropyl alcohol instead of methyl isobutyl ketone when incorporated with alumina and used in a fixed bed reactor. Also, chromium alone or in combination with iron, zinc or copper is ineffective.

Unexpectedly, we discovered that a catalyst comprising palladium and chromium on a carrier, preferably alumina pellets, exhibited a very high selectivity for MIBK at reasonably high conversion of acetone per pass. To demonstrate this, a commercially available catalyst was employed which contained approximately 0.5 wt. percent Pd, and 0.5% Cr on alumina. A particular batch used in the examples was found by emission spectrography to contain 0.55 wt. percent Pd, 0.47 wt. percent Cr and possibly a trace of Si, Fe, Mg and Ca, the remainder being $Al_2O_3$. Labelled as a promoted palladium an alumina catalyst, it has been suggested as a hydrogenation catalyst, especially for hydrogenation of olefins, but no mention has been made to the effect that it can catalyze a complex reaction involving condensation, dehydration and hydrogenation as in the case of the single-step synthesis of MIBK from acetone and hydrogen.

As shown later, Pd, Cr and $Al_2O_3$ may be put together in a different way without significantly changing specific catalytic effects. It follows that the manner in which such a catalyst is made by the manufacturer should not be regarded as the critical factor for the selective catalytic effect under question.

As mentioned before, the catalyst was activated by passing hydrogen over the catalyst at about 600° to 700°

TABLE IV.—CONVERISON OF ACETONE TO MIBK
[Cr-bearing catalysts]

| | Catalyst | | | | | | | | |
|---|---|---|---|---|---|---|---|---|---|
| | H | | I | | J | | | K | |
| Run No | 30 | 31 | 32 | 33 | 34 | 35 | 36 | 37 | 38 |
| Catalyst Age, hrs | 8–10 | 35–37 | 14–16 | 23–25 | 16–18 | 25–27 | 30–32 | 6–8 | 10–12 |
| Max. Temp., °F | 277 | 530 | 292 | 385 | 295 | 383 | 499 | 456 | 498 |
| Average Temp., °F | 273 | 527 | 278 | 379 | 274 | 377 | 474 | 452 | 493 |
| Pressure, p.s.i.g | 400 | 400 | 400 | 400 | 400 | 400 | 400 | 400 | 400 |
| Acetone, LVHSV | 0.153 | 0.165 | 0.159 | 0.153 | 0.154 | 0.159 | 0.160 | 4.0 | 4.0 |
| $H_2$/acetone wt. ratio | 0.059 | 0.055 | 0.57 | 0.059 | 0.059 | 0.057 | 0.056 | 0.018 | 0.018 |
| Conversion per pass, percent based on acetone | 33.5 | 61.3 | 99.3 | 91.1 | 99.5 | 96.4 | 81.5 | 15.6 | 12.6 |
| Selectivity, percent based on acetone (averaged over a period specified): | | | | | | | | | |
| MIBK | | 1.1 | | 0.4 | | 0.4 | 5.8 | 0.7 | 0.9 |
| DIBK | | | | | | | 1.8 | | |
| MIBC [1] | | 3.1 | 0.8 | 3.4 | 1.2 | 5.9 | 1.2 | | |
| IPA | | 12.6 | 91.1 | 93.5 | 97.2 | 71.3 | 34.5 | 1.8 | 3.1 |
| Mesityl oxide | 35.0 | 2.9 | | | | | 3.1 | 25.7 | 23.0 |
| Mesitylene | | | | | | | 2.5 | 35.8 | 17.7 |
| 4-methyl-pentene-2-one | [2] N.D. | [2] N.D. | [2] N.D. | [2] N.D. | [2] N.D. | [2] N.D. | [2] N.D. | 30.0 | 46.9 |
| Others | 65.0 | 80.3 | 8.1 | 2.7 | 1.6 | 22.4 | 51.1 | 6.0 | 8.4 |

[1] Methyl isobutyl carbinol, [2] Not determined.

Table IV clearly indicates that chromium alone or in combination with zinc, iron or copper is ineffective for converting acetone to MIBK. The predominant products are either isopropyl alcohol, mesityl oxide or mesitylene.

The experiments thus far have indicated that the reaction of acetone with hydrogen to prepare MIBK is pro- F. for several hours. Without activation it was found that the catalyst exhibited an increased selectivity to IPA and reduced selectivity to MIBK at the beginning but since the process used hydrogen as one of the charge stocks, a gradual activation did take place eventually. Several batches of the same catalyst were used to collect the data listed in Tables V through VIII. In all cases the activation procedure was followed.

It was first observed that the catalyst showed a period of hyperactivity during the first 100~200 hours after activation but thereafter leveled off to the normal condition and remained practically stable for more than 2000 hours.

Table V contains typical examples which illustrate this point. The pressure (400 p.s.i.g.), LVHSV (4.0), and feed ratio ($H_2$/acetone=0.018 by wt.) were held constant but the bed temperature was varied from 390° to 527° F. Conversion per pass and selectivities are calculated for Table V, the same as in Tables I to IV. If the conversion of acetone per pass is plotted against the average catalyst bed temperature, it can be readily shown that Runs 39 through 46 form a cluster of data distinctive from the correlation curve based on Runs 47 through 53. During this short hyperactive period, for example, the conversion of acetone per pass is about 23% at 395° F. while under normal conditions it is about 10.5% at the same temperature. Similarly at 525° F., the conversion of acetone per pass is about 42% under the initial hyperactive state and drops to about 32% under normal conditions. However, selectivity is not affected significantly by aging.

To compare the effect of pressure at a relatively low space velocity under normal activity of catalyst, another series of runs is summarized in Table VI. Raising the pressure from 220 p.s.i.g. (Runs 54, 55 and 56) to 400 p.s.i.g. (Runs 57 and 58) and from 400 p.s.i.g. to 650 p.s.i.g. (Run 59) shows an increase in conversion of acetone per pass with little drop in selectivity to MIBK.

The results in Table VII (Runs 60 through 63) show the effect of temperature at lower feed ratio ($H_2$/acetone-½ stoichiometric) and at higher pressure (1000 p.s.i.g.). From these results it is seen that the conversion of acetone per pass increases with increased temperature while selectivity to MIBK exhibits a downward trend. The selectivity to DIBK, on the other hand, increases with increased temperature. Also, comparisons of Run 60 with Run 50, Run 61 with Run 53, and Run 63 with Run 46 all indicate that both conversion of acetone per pass and selectivity to MIBK are improved by higher pressure and excess of acetone (lower $H_2$/acetone feed ratio).

TABLE VII.—CONVERSION OF ACETONE AND HYDROGEN TO MIBK

[Catalyst bed: 1.50″ dia., 21⅞″ H, containing 600 ml. of 3/16″ pellets]

| Run No. | 60 | 61 | 62 | 63 |
|---|---|---|---|---|
| Catalyst Age, hrs | 798–9.5 | 804–5.5 | 819–20.5 | 828–9.5 |
| Max. Temp., °F | 415 | 463 | 522 | 540 |
| Average Temp., °F | 399 | 431 | 476 | 491 |
| Pressure, p.s.i.g | 1,000 | 1,000 | 1,000 | 1,000 |
| Acetone, LVHSV | 4.0 | 4.0 | 4.0 | 4.0 |
| $H_2$/acetone wt. ratio | 0.009 | 0.009 | 0.009 | 0.009 |
| Conversion, percent based on acetone | 18.2 | 27.5 | 38.5 | 44.5 |
| Selectivities, percent based on acetone (averaged over the period specified): | | | | |
| MIBK | 91.3 | 87.7 | 84.9 | 79.4 |
| DIBK | 2.0 | 4.9 | 7.3 | 8.3 |
| MIBC | | 0.4 | 0.3 | 0.3 |
| IPA | 3.7 | 3.9 | 3.5 | 2.0 |
| Mesityl Oxide | 2.6 | 2.5 | 2.2 | 1.9 |
| 2-methylpentane | | | 0.3 | 0.3 |
| Others | | 0.1 | 0.4 | 6.5 |

TABLE V.—CONVERSION OF ACETONE AND HYDROGEN TO MIBK

| Run No | 39 | 40 | 41 | 42 | 43 | 44 | 45 | 46 |
|---|---|---|---|---|---|---|---|---|
| Catalyst Age, hrs | 20–2 | 44–6 | 69–71 | 83–5 | 95–7 | 127–9 | 163–5 | 121–3 |
| Max. Temp., °F | 547 | 544 | 531 | 539 | 419 | 422 | 428 | 540 |
| Average Temp., °F | 527 | 524 | 513 | 526 | 394 | 395 | 409 | 521 |
| Pressure, p.s.i.g | 400 | 400 | 400 | 400 | 400 | 400 | 400 | 400 |
| Acetone, LVHSV | 4.03 | 4.01 | 4.02 | 3.97 | 4.17 | 3.98 | 3.99 | 3.95 |
| $H_2$/acetone wt. ratio | 0.018 | 0.018 | 0.018 | 0.018 | 0.017 | 0.018 | 0.018 | 0.018 |
| Conversion, percent based on acetone | 40.1 | 43.0 | 41.8 | 42.1 | 24.3 | 23.1 | 22.4 | 40.7 |
| Selectivities, percent based on acetone (averaged over the preiod specified): | | | | | | | | |
| MIBK | 67.6 | 61.1 | 59.7 | 59.6 | 80.1 | 78.5 | 83.9 | 62.2 |
| DIBK | 14.5 | 14.0 | 14.5 | 12.9 | 10.9 | 10.8 | 9.4 | 14.5 |
| MIBC | 1.1 | 1.1 | 1.6 | 0.5 | 0.8 | 1.3 | | 1.1 |
| IPA | 4.1 | 4.5 | 4.4 | 4.8 | 4.8 | 5.7 | 4.2 | 5.7 |
| Mesityl Oxide | 1.2 | 0.8 | 1.4 | 0.6 | | | | 1.5 |
| Mesitylene | 4.7 | 4.0 | 3.8 | 3.5 | 1.2 | 1.3 | | 3.6 |
| Others | 6.8 | 14.5 | 14.6 | 19.1 | | | | 11.4 |

| Run No | 47 | 48 | 49 | 50 | 51 | 52 | 53 |
|---|---|---|---|---|---|---|---|
| Catalyst Age, hrs | 322–4 | 840–2 | 852–4 | 908–10 | 968–70 | 986–8 | 1196–8 |
| Max. Temp., °F | 522 | 510 | 509 | 399 | 395 | 539 | 438 |
| Average Temp., °F | 504 | 501 | 499 | 395 | 390 | 526 | 429 |
| Pressure, p.s.i.g | 400 | 400 | 400 | 400 | 400 | 400 | 400 |
| Acetone, LVSHV | 3.96 | 4.0 | 4.0 | 4.0 | 4.0 | 4.0 | 4.0 |
| $H_2$/acetone wt. ratio | 0.019 | 0.019 | 0.019 | 0.018 | 0.018 | 0.018 | 0.018 |
| Conversion, percent based on acetone | 30.5 | 26.6 | 27.1 | 10.3 | 10.5 | 32.3 | 18.8 |
| Selectivities, percent based on acetone (averaged over the period specified): | | | | | | | |
| MIBK | 70.5 | 72.4 | 71.2 | 85.4 | 90.4 | 65.0 | 76.9 |
| DIBK | 9.7 | 8.8 | 10.0 | 5.3 | 4.6 | 10.7 | 5.2 |
| MIBC | 0.4 | 0.9 | 0.9 | | | 1.1 | |
| IPA | 4.8 | 8.0 | 7.9 | 6.8 | 3.6 | 6.7 | 1.6 |
| Mesityl Oxide | | 0.9 | 0.9 | | | | |
| Mesitylene | 2.4 | 3.3 | 3.8 | 2.5 | 1.4 | 11.5 | 0.8 |
| Others | 12.2 | 5.7 | 5.3 | | | | 15.5 |

TABLE VI.—CONVERSION OF ACETONE AND HYDROGEN TO MIBK

| Run No, | 54 | 55 | 56 | 57 | 58 | 59 |
|---|---|---|---|---|---|---|
| Catalyst Age, hrs | 436–8 | 926–8 | 936–8 | 942–4 | 952–4 | 1228–3 |
| Max. Temp., °F | 383 | 385 | 393 | 389 | 385 | 387 |
| Average Temp., °F | 382 | 382 | 392 | 386 | 382 | 382 |
| Pressure, p.s.i.g | 220 | 220 | 220 | 400 | 400 | 650 |
| Acetone, LVHSV | 1.0 | 1.0 | 1.0 | 1.0 | 1.0 | 1.02 |
| $H_2$/acetone wt. ratio | 0.030 | 0.030 | 0.030 | 0.030 | 0.030 | 0.030 |
| Material Recovery, percent | 98.5 | 97.4 | 99.1 | 99.4 | 98.2 | 99.3 |
| Conversion, percent based on acetone | 18.1 | 19.8 | 19.8 | 21.2 | 20.8 | 22.1 |
| Selectivities, percent based on acetone (averaged over the period specified): | | | | | | |
| MIBK | 88.8 | 81.5 | 76.2 | 80.6 | 79.6 | 84.3 |
| DIBK | 6.9 | 9.3 | 6.8 | 5.2 | 5.9 | 5.6 |
| MIBC | | | | | | 0.5 |
| IPA | 3.5 | 6.3 | 5.9 | 4.1 | 3.7 | 3.1 |
| Mesityl Oxide | | 0.6 | | | | |
| Mesitylene | 0.8 | 0.7 | 0.7 | 0.7 | 1.4 | 1.3 |
| Others | | 0.6 | 10.4 | 9.4 | 9.4 | 5.2 |

To determine the yield pattern at the extremely low space velocities, another series of runs was carried out. The results are shown in Table VIII. Since the catalyst age was within the first 120 hours, the catalyst was presumably under a hyperactive condition. As mentioned previously, conversion of acetone per pass should drop considerably under normal activity but the product distribution (selectivity) will maintain its general trend regardless of catalyst age. At higher temperatures (above 470° F.) which inevitably lead to very high conversion (above 80%) at a very low space velocity, formation of diisobutyl ketone became predominant as shown in Runs 66 through 72. The trend that selectivity to DIBK increases with increased conversion per pass is also noticeable in Runs 39 through 53 (Table V). It is also apparent that lower pressures favor the formation of DIBK when the runs in Table V are compared with those in Table VII.

Palladium was coated on the pellets by reducing with formaldehyde from an aqueous solution (200 cc.) containing 0.80 g. palladium chloride and 0.70 g. potassium chloride. After all the palladium was precipitated, the aqueous solution was decanted and the pellets calcined at 950° F.

From Table IX it is obvious that this catalyst also exhibited high selectivity at reasonably high conversion. Admittedly, some methods of preparing the catalyst are preferred to others with respect to physical strength, cost of preparation and relative activity, etc. The basic characteristics of a Pd-Cr-Al$_2$O$_3$ catalyst to promote the MIBK synthesis, however, is not changed significantly by the method of preparation. Consequently, an equally satisfactory catalyst can be prepared by different methods depending on economic factors. For example, the Pd and Cr in powder form can be incorporated in or deposited on Al$_2$O$_3$ to form a catalyst having suitable catalytic properties, though it may be lacking in mechanical strength. Since also these metals need not be present entirely in the free state and may be transferred into the totally or substantially totally reduced state during use the use of the words "palladium" and/or "chromium" in this specification and claims is intended to include the oxide forms thereof.

In order to demonstrate that a combination of palladium and chromium is a key factor which constitutes a selective catalytic effect and that a manner by which these active components are put together is only of secondary importance, a catalyst comprising 0.25 wt. percent Pd, 10% CrO$_3$ with respect to alumina was prepared and tested. The results are shown in Table IX.

The catalyst was prepared as follows: 70 g. CrO$_3$ and 700 g. Al$_2$O$_3$ were made into a slurry with 600 cc. of an aqueous solution containing 2 vol. percent of Cellosolve. After being dried at 230° F., the solid lump was crushed and blended with 4 wt. percent graphite (lubricant). The ⅛″ pellets were made of 60 mesh powder and calcined at 450° F. for 1 hour, 950° F. for 2 hours and 1950° F. for another 2 hours. A portion of pellets thus prepared (174.1 g.) was then soaked in n-heptane, and then partially dried.

In another series of experiments (Runs 80 through 89), methyl ethyl ketone (MEK) was used as a starting low-boiling ketone to prepare 5-methyl heptanone-3 (or commonly known as ethyl amyl ketone or EAK). The catalyst used was a commercially available Pd-Cr-Al$_2$O$_3$ catalyst, the same as was used previously. The results of these experiments are summarized in Table X. The method of calculation was similar to that used in the previous ex-

TABLE IX.—CONVERSION OF ACETONE AND HYDROGEN TO MIBK

| Run No | 73 | 74 | 75 | 76 | 77 | 78 | 79 |
|---|---|---|---|---|---|---|---|
| Catalyst Age, hrs | 9–11 | 14–6 | 27–9 | 35–7 | 58–60 | 67–9 | 87–9 |
| Max. Temp., ° F | 281 | 406 | 510 | 529 | 530 | 382 | 391 |
| Average Temp., ° F | 279 | 395 | 500 | 508 | 512 | 370 | 375 |
| Pressure, p.s.i.g | 220 | 220 | 220 | 220 | 400 | 400 | 220 |
| Acetone, LVHSV | 1.01 | 1.03 | 1.00 | 6.75 | 4.03 | 3.98 | 2.45 |
| H$_2$/acetone wt. ratio | 0.030 | 0.030 | 0.031 | 0.018 | 0.009 | 0.019 | 0.018 |
| Conversion, percent based on acetone | 10.5 | 46.8 | 51.8 | 20.1 | 26.7 | 7.7 | 11.4 |
| Selectivities, percent based on acetone (averaged over the period specified): | | | | | | | |
| MIBK | 87.7 | 59.2 | 52.8 | 50.3 | 48.0 | 87.3 | 78.7 |
| DIBK | 1.1 | 3.4 | 10.0 | 3.1 | 0.9 | 4.1 | 3.2 |
| MIBC | | 1.7 | 0.4 | | | | |
| IPA | 11.2 | 6.9 | 1.9 | 0.5 | 1.5 | 1.1 | 1.7 |
| Mesityl Oxide | | | 0.6 | 3.0 | 7.1 | 2.6 | 2.1 |
| Mesitylene | | 3.1 | 3.2 | 2.2 | 1.1 | 4.9 | 2.6 |
| Others | | 25.7 | 31.1 | 40.9 | 41.4 | | 11.7 |

TABLE VIII.— CONVERSION OF ACETONE AND HYDROGEN TO MIBK WITH PROMOTED Pd ON ALUMINA

| Run No | 64 | 65 | 66 | 67 | 68 | 69 | 70 | 71 | 72 |
|---|---|---|---|---|---|---|---|---|---|
| Catalyst Age, hrs | 13–15 | 18–20 | 34–36 | 29–31 | 50–52 | 62–64 | 78–80 | 94–96 | 118–20 |
| Max. Temp., ° F | 290 | 380 | 531 | 493 | 491 | 475 | 490 | 491 | 490 |
| Average Temp., ° F | 280 | 371 | 519 | 479 | 479 | 467 | 477 | 474 | 480 |
| Pressure, p.s.i.g | 400 | 400 | 400 | 400 | 400 | 400 | 400 | 400 | 400 |
| Acetone, LVSHV | 0.150 | 0.159 | 0.156 | 0.146 | 0.162 | 0.159 | 0.156 | 0.157 | 0.125 |
| H$_2$/acetone wt. ratio | 0.060 | 0.057 | 0.058 | 0.063 | 0.056 | 0.057 | 0.058 | 0.057 | 0.073 |
| Conversion, percent based on acetone | 33.5 | 66.9 | 94.8 | 92.5 | 83.8 | 86.4 | 86.5 | 85.8 | 84.9 |
| Selectivities, percent based on acetone (averaged over the period specified): | | | | | | | | | |
| MIBK | 40.2 | 28.4 | 18.5 | 19.9 | 18.2 | 29.1 | 26.5 | 29.0 | 28.6 |
| DIBK | 2.2 | 5.8 | 27.6 | 43.6 | 34.6 | 40.4 | 35.1 | 31.1 | 32.2 |
| MIBC | 0.3 | 7.8 | 0.2 | 1.3 | 2.0 | 2.5 | 1.5 | 2.5 | 2.1 |
| IPA | 53.5 | 47.3 | 0.5 | 1.9 | 4.0 | 6.2 | 3.5 | 6.7 | 5.4 |
| Mesityl oxide | 0.1 | | 0.2 | | | | | | |
| Mesitylene | 0.4 | 0.9 | 2.3 | 3.9 | 5.1 | 4.2 | 3.9 | 3.6 | 3.8 |
| Others | 2.7 | 9.8 | 50.7 | 29.4 | 36.1 | 17.6 | 29.1 | 27.1 | 27.9 | amples, i.e., the values for "other" products were obtained by difference.

TABLE X.—CONVERSION OF MEK AND HYDROGEN TO 5-METHYLHEPTANONE-3 (EAK)

| Run No | 80 | 81 | 82 | 83 | 84 | 85 | 86 | 87 | 88 | 89 |
|---|---|---|---|---|---|---|---|---|---|---|
| Catalyst Age, hrs | 16-8 | 32-4 | 53-5 | 65-7 | 95-7 | 116-8 | 122-6 | 148-50 | 160-2 | 172-4 |
| Max. Temp., °F | 405 | 463 | 523 | 400 | 460 | 421 | 461 | 519 | 412 | 455 |
| Average Temp., °F | 402 | 454 | 509 | 399 | 453 | 414 | 453 | 512 | 409 | 542 |
| Pressure, p.s.i.g | 800 | 800 | 800 | 400 | 400 | 200 | 200 | 200 | 800 | 800 |
| MEK, LVHSV | 2.0 | 2.0 | 2.0 | 2.0 | 2.0 | 2.0 | 2.0 | .2.0 | 4.0 | 4.0 |
| $H_2$/MEK wt. ratio | 0.014 | 0.014 | 0.014 | 0.014 | 0.014 | 0.014 | 0.014 | 0.014 | 0.014 | 0.014 |
| Conversion, percent based on MEK | 11.6 | 26.1 | 34.8 | 12.1 | 18.0 | 9.6 | 14.3 | 23.5 | 7.0 | 14.5 |
| Selectivities, percent based on MEK (averaged over the period specified): | | | | | | | | | | |
| 5-methylheptanone-3 | 54.5 | 60.6 | 64.3 | 56.5 | 63.6 | 58.7 | 66.0 | 56.5 | 55.7 | 51.7 |
| n-$C_4$ | 5.2 | 7.2 | 4.3 | 2.5 | 6.7 | 1.6 | 4.2 | 3.8 | 4.2 | 7.3 |
| $C_8$ paraffin | 4.4 | 2.8 | 3.3 | 4.2 | 2.8 | 2.6 | 1.8 | 2.2 | 1.8 | 3.5 |
| Sec.-butyl alcohol | 10.1 | 1.1 | 0.6 | 3.2 | 2.7 | 2.0 | 2.7 | 1.2 | 5.5 | 2.7 |
| Others | 25.8 | 28.3 | 27.5 | 33.6 | 24.2 | 35.1 | 25.3 | 36.3 | 32.8 | 34.8 |

From Table X, it can be seen that the synthesis of 5-methylheptanone-3 from methyl ethyl ketone is somewhat slower than the synthesis of methyl isobutyl ketone from acetone. Selectivity to 5-methylheptanone-3 is also somewhat lower. Nevertheless, the overall performance of the catalyst was quite good considering that only a limited range of variables was tested.

A feature of this invention is that in applying the process to acetone as the low-boiling ketone the selectivity of the reaction for the desired higher-boiling ketone can be shifted. Thus, the primary product can be methyl isobutyl ketone or diisobutyl ketone or mixtures of same as desired to meet economic demands. By conducting the reaction with acetone at 350° F. to 450° F. and using space velocities in the order of 3.0 to 4.0, the primary product is methyl isobutyl ketone. On the other hand, if the reaction is conducted at a temperature of about 470° F. to 550° F., using acetone space velocities of 0.1 to 1.0, the selectivity for diisobutyl ketone can be materially increased. Furthermore, this shift in the selectivity of the process can be accomplished at economical pressures, hydrogen ratios and with increased conversion of acetone per pass.

The carrier for the palladium and chromium which catalyze the reaction can be any inert carrier, preferably having a relatively low surface area in the order of 10 m.²/g. to 150 m.²/g. Examples of such inert carriers are alumina, pumice, Celite and silica. The preferred carrier is alumina.

The catalyst used in the reaction of this invention is preferably a coated catalyst by which is meant that an active ingredient is placed primarily on the exterior of the carrier pellets forming a thin layer in the order of 1/32-inch thick or less. Impregnated catalysts are ordinarily obtained by using a high surface area carrier and by distributing the catalytic metal on the micropore surface well into the interstices of the carrier. In our case, however, best results and longer catalyst life are obtained using a coated catalyst presumably due to the fact that a diffusion of branched large molecules such as MIBK or EAK is involved in the reaction system. The catalyst compositions stated herein take into account the entire amount of the carrier which means that the main portion of the catalytically active palladium and chromium are on the macroscopic exterior surface of the carrier. This surface will in general be from 1/128- to 1/32-inch in depth, although this invention is not to be so limited.

After impregnation or coating of the low surface area carrier with the desired metal salt, same is generally calcined at 950~1500° F. in the presence of air to transform the metals to their oxide form, to burn off graphite if used as a lubricant for pelleting, and to stabilize the catalyst consistency. The manner in which the catalyst is prepared may be varied in many ways without significantly changing the basic characteristics of catalytic behavior as long as the catalyst contains active sites of palladium and chromium. Best results are obtained with a coated catalyst containing about 0.5 to 1.5% by wt. of palladium and 0.3 to 1.5% wt. of chromium, on an inert carrier, which is preferably substantially pure $Al_2O_3$. A small amount of other inert materials to the extent of 4.0% by wt. in the carrier can be tolerated by the reaction. "Activation" of the catalyst used in this process is highly desirable as pointed out previously. For this purpose, the hydrogenation can be carried out at temperatures from about 600° F. to about 1200° F., although this invention is not to be so limited. The preferred activation temperature is about 600–700° F.

From this description it is seen that the instant invention is directed to a process of converting low-boiling, saturated aliphatic ketones to higher-boiling, saturated aliphatic ketones by heating the lower-boiling ketones with hydrogen in the presence of a palladium-chromium catalyst on an inert carrier. Because the catalyst is immune to certain impurities an advantage arises in the fact that strict hydrogen purification is unnecessary and hydrogen from other processes can be used, i.e., reformer hydrogen.

It is also implicit in the process of this invention that the effluent products from the reactor are subjected to various separation steps to recover unreacted hydrogen, uncondensable gases, unreacted low-boiling ketone, any lighter by-products and a fraction or fractions containing the desired higher-boiling ketone or ketones, using techniques well known to this art. In carrying out this product separation the unreacted hydrogen obtained is recycled to the reactor. From time to time, a portion of recycled hydrogen is bled from the system in order to prevent the accumulation of gaseous impurities, such as propane, propylene, etc. in the system. In a first distillation to recover the main body of unreacted low-boiling ketone, i.e., acetone, for recycle, it is expedient to draw the acetone fraction off as a side stream while removing as overhead a so-called "heads" fraction which contains, among other ingredients, 2-methyl pentane. This prevents the accumulation of such light by-products in the system and the unreacted low-boiling ketone may be recycled to the reactor without the necessity of further purification. Also, any water formed during the reaction is eventually separated during the course of fractionating the remaining products. No particular difficulty is encountered in the product separation and further description is unnecessary.

For purposes of this invention the reaction can be conducted under any conditions wherein a lower-boiling ketone or mixture of lower-boiling ketones, as herein defined, is contacted with the hydrogen in the presence of a catalyst presenting active associated centers of palladium and chromium to the reactants, regardless of the composition of the remaining ingredients of the reaction environment so long as these remaining ingredients do not interfere with the reaction. The reaction may be carried out in the liquid phase using a slurry or suspension of such catalytic centers of palladium and chromium however prepared. For example, a slurry of finely divided or powdered carrier such as alumina containing or coated with active sites of palladium and chromium in an inert, stable high-boiling solvent may be used under conditions wherein a temperature of at least about 300° F. can be maintained. In some cases the inert solvent can act as the inert carrier for the centers of active associated palladium and chromium. The active centers or sites of associated palladium and chromium may be presented to the ketone and hydrogen reactants as a plurality of individual units in a continuous or discontinuous micro-surface or as a mono-molecular film or as a macro-coating. Thus, in addition to the catalyst preparations so far presented, the active metals may be applied to the carrier surface by known metal vaporization and spray techniques. The most practical method of carrying out the invention is to use a column or vessel packed with the catalyst in the form of an inert carrier presenting the active centers of palladium and chromium to the voids or interstices through which the vapors of ketone and hydrogen are passed. The carrier under these conditions provides the necessary voids or interstices to allow the passage of reactant vapors therethrough.

The invention accordingly applies to any modifications or techniques which accomplish the contacting of a lower-boiling ketone and hydrogen with a catalyst presenting active associated centers of palladium and chromium, either in activated from or in a form which becomes activated or reduced in situ, for the purpose of transforming the lower-boiling ketone to a higher-boiling ketone or a mixture of higher-boiling ketones. In some instances the primary interest in the reaction may be directed to one or more of the non-ketone by-products.

Although the invention has been demonstrated by certain specific examples, these are merely illustrative and various modifications will become apparent to one skilled in this art without departing from the spirit of this invention. For example, the hydrogen-ketone weight ratios are subject to definite variation depending on the degree of conversion desired and the operating conditions chosen or imposed. When using acetone as the feed, the $H_2$/acetone weight ratio may be varied from about 0.0035 to 0.05, that is, about one-fifth of stoichiometric to about three times stoichiometric. When operating in the higher ranges of temperature and pressure, e.g., 400° F. to 600° F. and 500 p.s.i.g. to 1500 p.s.i.g., for the purpose of transforming acetone to methyl isobutyl ketone, the best results are obtained using $H_2$/acetone weight ratios of less than stoichiometric, e.g., 0.004 to 0.017 and preferably about 0.009. Conversely, when operating within the lower temperature and pressure ranges, the $H_2$/acetone feed ratio in excess of stoichiometric may be preferred. In any event, the minimum hydrogen requirements at the conversion level sought or selected should be maintained at least, e.g., at a 25% conversion level the $H_2$/actone minimum requirements would be one-fourth of stoichiometric (0.0043); at a 50% conversion level the minimum requirement would be one-half of stoichiometric (0.0087) and at a 100% conversion level the minimum hydrogen requirements would be stoichiometric or an $H_2$/acetone weight ratio of 0.0174. Generally speaking, an excess of hydrogen with respect to this minimum requirement would be preferred. On the same basis the $H_2$/ketone weight ratios for the other lower-boiling ketone reactants would be about one-fifth of stoichiometric to as high as three (3) times stoichiometric depending on the ketone itself and the operating conditions. Other modifications of the process of this invention will become apparent to one skilled in the art and the only limitations attaching to this invention appear in the appended claims.

The embodiments of the invention in which an exclusive property or privilege is claimed are defined as follows:

1. The process of converting lower-boiling, $C_3$ to $C_6$ alkanones to higher-boiling, saturated alkanones which comprises heating said lower-boiling alkanones and hydrogen at a temperature of from about 300°–600° F. and a pressure of about 150–1500 p.s.i.g. in the presence of a fixed bed catalyst comprising an inert carrier, about 0.2 to 5.0% by weight of palladium and about 0.2 to 10.0% by weight of chromium, based on the weight of said carrier.

2. The process in accordance with claim 1 in which said catalyst comprises an inert carrier having a surface area of about 10 m.²/g. to 150 m.²/g. coated with said palladium and chromium.

3. The process in accordance with claim 2 in which about 0.5 to 1.5% by weight of palladium and about 0.3 to 1.5% by weight of chromium are present in said coating.

4. The process in accordance with claim 1 in which said low-boiling alkanone is heated to a temperature of about 300° to 600° F. and said reaction is conducted at about 150 to 1500 p.s.i.g., using about 0.05 to 10.0 LVHSV of said low-boiling ketone.

5. The process in accordance with claim 1 in which said low-boiling alkanone is methyl ethyl ketone and the primary product is ethyl amyl ketone.

6. The process in accordance with claim 1 in which said reaction is conducted at a temperature of about 400° to 450° F., said low-boiling alkanone is acetone, the liquid volume hourly space velocity of said acetone is about 2.0 to 5.0, the operating pressure is about 800 to 1200 p.s.i.g. and the primary product is methyl isobutyl ketone.

7. The process in accordance with claim 1 in which said reaction is conducted at a temperature of about 450° F. to 600° F., said low-boiling alkanone is acetone, the liquid volume hourly space velocity of said acetone is about 0.05 to 2.0, the operating pressure is about 150 to 600 p.s.i.g. and the primary product is a mixture of methyl isobutyl ketone and diisobutyl ketone.

8. The process in accordance with claim 1 in which said reaction is conducted at a temperature of about 450° to 600° F., said low-boiling alkanone is methyl ethyl ketone, the said liquid volume hourly space velocity of said methyl ethyl ketone is about 0.5 to 2.0, the operating pressure is about 800 to 1500 p.s.i.g. and the primary product is 5-methylheptanone-3.

9. The process in accordance with claim 1 in which said alkanone is a member of the group consisting of acetone, methyl ethyl ketone, diethyl ketone, methyl propyl ketone, methyl isopropyl ketone, methyl butyl ketone, methyl isobutyl ketone and mixtures thereof.

10. The process in accordance with claim 1 in which said low-boiling alkanone is acetone and said reaction is conducted at an average temperature of about 431° to about 476° F., a pressure of about 1000 p.s.i.g., using about 4.0 LVHSV of acetone, a $H_2$/acetone weight ratio of about 0.009 and recovering methyl isobutyl ketone as the primary product.

11. The process in accordance with claim 1 in which said catalyst comprises about 0.5 wt. percent of palladium and about 0.5 wt. percent of chromium on alumina.

12. The process in accordance with claim 11 in which said alumina has a surface area of about 10 m.²/g. to about 150 m.²/g.

13. The process in accordance with claim 10 in which said catalyst is activated by pre-treatment with hydrogen at a temperature of about 600° to 1200° F. for about 3 to 4 hours.

14. The process in accordance with claim 11 in which said catalyst has active associated centers of palladium and chromium.

15. The process according to claim 11 in which substantially stoichiometric weight ratios of acetone is contacted with hydrogen at a temperature of at least about 300° F. in the presence of a catalyst having active associated sites of palladium and chromium.

16. The process of converting acetone to a mixture of methyl isobutyl ketone, diisobutylketone and isopropyl alcohol which comprises heating acetone with hydrogen at an average catalyst bed temperature of about 390°–520° F., under a pressure of about 220–1000 p.s.i.g., at a liquid volume hourly space velocity of 2.0–6.5 and a feed ratio of $H_2$/acetone of about 0.009–0.018 by weight, in the presence of a fixed bed catalyst comprising an inert carrier, about 0.2–5.0% by weight of palladium and about 0.2 to 10.0% by weight of chromium, based on the weight of said carrier.

17. The process of claim 16 in which the inert carrier is alumina.

References Cited
UNITED STATES PATENTS

| | | | |
|---|---|---|---|
| 2,064,254 | 12/1936 | Fuchs et al. | 260—593 |
| 2,499,172 | 2/1950 | Smith | 260—593 |
| 2,867,663 | 1/1959 | Lacey | 260—593 |
| 3,153,068 | 10/1964 | Porter et al. | 260—593 |

BERNARD HELFIN, *Acting Primary Examiner.*

LEON ZITVER, *Examiner.*

M. JACOB, *Assistant Examiner.*